United States Patent
Son et al.

(10) Patent No.: US 8,941,683 B2
(45) Date of Patent: Jan. 27, 2015

(54) TRANSPARENT DISPLAY INTERACTION

(75) Inventors: Sung Ho Son, Bellevue, WA (US); Rod G. Fleck, Bellevue, WA (US); Jordan P. Evans, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 472 days.

(21) Appl. No.: 12/917,265

(22) Filed: Nov. 1, 2010

(65) Prior Publication Data

US 2012/0105487 A1 May 3, 2012

(51) Int. Cl.
| G09G 5/00 | (2006.01) |
| G06F 3/0487 | (2013.01) |
| G06T 19/00 | (2011.01) |
| G06F 1/16 | (2006.01) |
| G06F 3/01 | (2006.01) |

(52) U.S. Cl.
CPC ............ G06F 3/0487 (2013.01); G06T 19/006 (2013.01); G06F 1/1637 (2013.01); G06F 1/1643 (2013.01); G06F 1/1647 (2013.01); G06F 3/011 (2013.01); G06F 2203/04804 (2013.01)
USPC .......................................... 345/629; 345/633

(58) Field of Classification Search
CPC ..................................................... G06T 19/006
USPC ................................................. 345/629, 633
See application file for complete search history.

(56) References Cited

U.S. PATENT DOCUMENTS

| 5,644,369 A | 7/1997 | Jachimowicz et al. |
| 5,745,203 A | 4/1998 | Valliath et al. |
| 5,896,575 A | 4/1999 | Higginbotham et al. |
| 6,215,920 B1 | 4/2001 | Whitehead et al. |
| 6,246,450 B1 | 6/2001 | Inbar |
| 6,452,582 B1 | 9/2002 | Rolston |
| 6,618,104 B1 | 9/2003 | Date et al. |
| 6,834,974 B2 | 12/2004 | Lee et al. |
| 6,961,167 B2 | 11/2005 | Prins et al. |
| 7,128,432 B1 | 10/2006 | Stern et al. |

(Continued)

FOREIGN PATENT DOCUMENTS

| CN | 1189047 | 2/2005 |
| CN | 1240042 | 2/2006 |

(Continued)

OTHER PUBLICATIONS

Patel, Nilay, "Double-Sided Transparent Touch Display would Make Battleship Amazing", Retrieved at << http://www.engadget.com/2008/08/29/double-sided-transparent-touch-display-would-make-battleship-ama >>, Aug. 29, 2008, pp. 5.

(Continued)

Primary Examiner — David T Welch
(74) Attorney, Agent, or Firm — Judy Yee; Micky Minhas

(57) ABSTRACT

In embodiments of transparent display interaction, a portable device includes a handheld base movably coupled to a display device. The display device includes a display panel system that displays an image, and includes display surfaces through which the image is viewable. The image may appear as being projected into an environment behind the display device and viewable through the display surfaces of the display device. The display device is also configurable to open relative the handheld base to a position that the environment is viewable through the display device.

19 Claims, 8 Drawing Sheets

(56) References Cited

U.S. PATENT DOCUMENTS

| | | |
|---|---|---|
| 7,154,469 B2 | 12/2006 | Weng |
| 7,205,959 B2 | 4/2007 | Henriksson |
| 7,230,764 B2 | 6/2007 | Mullen et al. |
| 7,273,291 B2 | 9/2007 | Kim et al. |
| 7,658,528 B2 | 2/2010 | Hoelen et al. |
| 7,701,517 B1 | 4/2010 | Geronimi |
| 7,804,502 B2* | 9/2010 | Azuma .................. 345/473 |
| 8,362,992 B2 | 1/2013 | Kuhlman et al. |
| 8,770,813 B2 | 7/2014 | Bohn et al. |
| 2001/0038425 A1 | 11/2001 | Lee |
| 2003/0020707 A1* | 1/2003 | Kangas et al. ............ 345/418 |
| 2003/0201969 A1 | 10/2003 | Hiyama et al. |
| 2003/0210222 A1 | 11/2003 | Ogiwara et al. |
| 2004/0075628 A1 | 4/2004 | Chien et al. |
| 2004/0150584 A1* | 8/2004 | Chuman et al. .............. 345/6 |
| 2004/0150653 A1* | 8/2004 | Sakamaki et al. .......... 345/592 |
| 2005/0052342 A1 | 3/2005 | Wu et al. |
| 2005/0140641 A1 | 6/2005 | Kim et al. |
| 2005/0215323 A1* | 9/2005 | Miyamoto et al. ........... 463/43 |
| 2006/0044286 A1 | 3/2006 | Kohlhaas et al. |
| 2006/0092355 A1 | 5/2006 | Yang et al. |
| 2006/0152658 A1 | 7/2006 | Ozawa et al. |
| 2006/0262976 A1* | 11/2006 | Hart et al. ................... 382/190 |
| 2007/0018585 A1 | 1/2007 | Ijzerman et al. |
| 2007/0078007 A1* | 4/2007 | Maekawa et al. ............ 463/43 |
| 2008/0055701 A1 | 3/2008 | Liu et al. |
| 2008/0063808 A1 | 3/2008 | Stumpe et al. |
| 2008/0136775 A1* | 6/2008 | Conant ..................... 345/156 |
| 2008/0186255 A1* | 8/2008 | Cohen et al. ................... 345/8 |
| 2008/0198292 A1 | 8/2008 | Marra et al. |
| 2008/0262910 A1 | 10/2008 | Altberg et al. |
| 2008/0297880 A1 | 12/2008 | Steckl et al. |
| 2009/0046220 A1 | 2/2009 | Tsuchiya et al. |
| 2009/0140950 A1 | 6/2009 | Woo et al. |
| 2009/0219253 A1 | 9/2009 | Izadi et al. |
| 2009/0232509 A1 | 9/2009 | Heikenfeld et al. |
| 2009/0295731 A1 | 12/2009 | Kim et al. |
| 2010/0045705 A1* | 2/2010 | Vertegaal et al. ........... 345/661 |
| 2010/0085510 A1 | 4/2010 | Okuyama et al. |
| 2010/0100842 A1 | 4/2010 | Kim |
| 2010/0128015 A1 | 5/2010 | Feenstra et al. |
| 2010/0144394 A1 | 6/2010 | Han et al. |
| 2010/0157410 A1 | 6/2010 | Kim et al. |
| 2010/0165634 A1 | 7/2010 | Hong et al. |
| 2010/0177025 A1 | 7/2010 | Nagata et al. |
| 2010/0207964 A1 | 8/2010 | Kimmel et al. |
| 2010/0277439 A1* | 11/2010 | Charlier et al. ............. 345/176 |
| 2011/0040539 A1* | 2/2011 | Szymczyk et al. ............ 703/6 |
| 2011/0124376 A1* | 5/2011 | Kim et al. ................... 455/566 |
| 2011/0137561 A1* | 6/2011 | Kankainen .................. 701/300 |
| 2011/0161875 A1* | 6/2011 | Kankainen .................. 715/810 |
| 2011/0164047 A1* | 7/2011 | Pance ........................ 345/581 |
| 2011/0164163 A1* | 7/2011 | Bilbrey et al. ............. 348/333.01 |
| 2011/0276556 A1* | 11/2011 | Meier et al. ................. 707/706 |
| 2011/0285622 A1* | 11/2011 | Marti et al. ................. 345/158 |
| 2012/0099250 A1* | 4/2012 | Robinson et al. .......... 361/679.01 |
| 2012/0102438 A1* | 4/2012 | Robinson et al. ............ 715/863 |
| 2012/0105306 A1 | 5/2012 | Fleck |
| 2012/0105428 A1 | 5/2012 | Fleck |
| 2012/0105474 A1* | 5/2012 | Cudalbu et al. ............. 345/633 |
| 2012/0105475 A1* | 5/2012 | Tseng ........................ 345/633 |
| 2012/0162268 A1 | 6/2012 | Fleck |
| 2012/0162269 A1 | 6/2012 | Bohn |
| 2012/0163021 A1 | 6/2012 | Bohn |
| 2012/0235827 A1* | 9/2012 | Chi et al. .................. 340/815.45 |
| 2013/0207896 A1* | 8/2013 | Robinson et al. ............ 345/158 |
| 2014/0286047 A1 | 9/2014 | Bohn et al. |

FOREIGN PATENT DOCUMENTS

| | | |
|---|---|---|
| CN | 1879139 | 12/2006 |
| EP | 2169966 | 3/2010 |
| JP | 2002208307 | 7/2002 |
| JP | 2002320012 | 10/2002 |
| JP | 2010231069 | 10/2010 |
| KR | 20080012005 | 2/2008 |
| KR | 20100038840 | 4/2010 |
| WO | WO-2010126756 | 11/2010 |

OTHER PUBLICATIONS

Greene, Kate, "Two-Sided Touch Screen", Retrieved at << http://www.technologyreview.in/computing/19300/ >>, Aug. 24, 2007, pp. 4.

Wu, et al., "Advanced Organic Light-Emitting Devices for Enhancing Display Performances", Retrieved at << http://ntur.lib.ntu.edu.tw/bitstream/246246/148555/1/37.pdf >>, Journal of Display Technology, vol. 01, No. 2, Dec. 2005, pp. 248-266.

"Final Office Action", U.S. Appl. No. 12/977,852, (May 7, 2013), 12 pages.

"Non-Final Office Action", U.S. Appl. No. 12/977,852, (Nov. 15, 2012), 10 pages.

"Non-Final Office Action", U.S. Appl. No. 12/977,943, (Dec. 28, 2012), 14 pages.

"Non-Final Office Action", U.S. Appl. No. 12/977,943, (May 9, 2013), 13 pages.

"Non-Final Office Action", U.S. Appl. No. 12/977,959, (May 9, 2013), 13 pages.

"PCT Search Report and Written Opinion", Application No. PCT/US2011/057479, (Apr. 10, 2012), 9 pages.

"PCT Search Report and Written Opinion", Application No. PCT/US2011/066757, (Sep. 25, 2012), 9 pages.

"Restriction Requirement", U.S. Appl. No. 12/977,852, (Sep. 6, 2012), 5 pages.

"Restriction Requirement", U.S. Appl. No. 12/977,943, (Aug. 20, 2012), 6 pages.

Aleksander, Marek et al., "Possibilities of application of polymer-dispersed liquid crystals in information displays", In Proceedings of SPIE 2004, vol. 5565, Available at <http://lib.semi.ac.cn:8080/tsh/dzzy/wsqk/SPIE/vol5565/5565-304.pdf>,(2004), pp. 304-308.

Giraldo, Andrea et al., "Transmissive Electrowetting-Based Displays for Portable Multi-Media Devices", SID 09 Digest, Available at <http://www.liquavista.com/downloads/getFile.aspx?DocID=112>, (2009), pp. 479-482.

Heikenfeld, J. et al., "Electrowetting Light Valves with Greater than 80% Transmission, Unlimited View Angle, and Video Response", SID 05 Digest, http://www.google.com/url?sa=t&source=web&cd=3&ved=0CBwQFjAC&url=http%3A%2F%2Fwww.ece.us.edu%2Fdevices%2FDownloads%2FDocuments&2FHeikenfeld_TransELV_SID05.pdf&rct=j&q=Electrowetting%20Light%20Valves%20with%20Greater%20than%2080%25%20Transmission%2C%20Unlim,(2005), pp. 1-4.

Hu, Heng-Cang et al., "Electrowetting-Based Total Internal Reflection Chip for Optical Switch and Display", In Proceedings of IEEE/LEOS 2007, Available at <http://ieeexplore.ieee.org/stamp/stamp.jsp?tp=&arnumber=4373844>,(2007), pp. 69-70.

Humphries, Matthew "Clear LCD display in development", Retrieved from: <http://www.geek.com/articles/consumer/clear-lcd-display-in-development-2007079/>on, (Jul. 9, 2007), 8 pages.

Klosowicz, Stanislaw J., "Polymer-dispersed liquid crystals as perspective media for displays and optical elements", In Proceedings of Symposium on Photonics Technologies for 7th Framework Program, Available at <http://www.opera2015.org/deliverables/D_4_3_CD-ROM_Wroclaw_Nieuw/6_Proceedings/46_Klosowicz.pdf>, (Oct. 2006), pp. 238-241.

Kwong, Vincent H., et al., "Control of reflectance of liquid droplets by means of electrowetting", Applied Optics, vol. 43, No. 4, Available at <http://www.phas.ubc.ca/ssp/papers/Publications/Control%20of%20Reflectance%20of%20Liquid%20Droplets%20by%20Means%20of%20Electrowetting.pdf>,(Feb. 2004), pp. 808-813.

"Foreign Office Action", CN Application No. 201110355941.3, Dec. 23, 2013, 12 Pages.

"Foreign Office Action", CN Application No. 201110436269.0, Nov. 25, 2013, 18 Pages.

(56) References Cited

OTHER PUBLICATIONS

"Non-Final Office Action", U.S. Appl. No. 12/914,761, (Aug. 9, 2013), 13 pages.

"Final Office Action", U.S. Appl. No. 12/914,761, Mar. 17, 2014, 15 pages.

"Notice of Allowance", U.S. Appl. No. 12/977,852, Feb. 24, 2014, 6 pages.

"Foreign Notice of Allowance", CN Application No. 201110436269.0, Aug. 1, 2014, 6 pages.

"Foreign Office Action", AU Application No. 2011320628, Sep. 10, 2014, 3 pages.

"Foreign Office Action", CN Application No. 201110355941.3, Aug. 13, 2014, 15 Pages.

"Foreign Office Action", CN Application No. 201110358454.2, Sep. 11, 2014, 15 pages.

\* cited by examiner

TRANSPARENT DISPLAY INTERACTION

BACKGROUND

Mobile phones and portable devices that display information when open or closed are typically implemented with two displays. For example, a mobile phone may have a larger, primary display for use when the device is open, and a smaller, secondary display on the back of the device to display the current time or a notification of an incoming call. The current flip, slide, or swivel type of phone devices allow a user to interact with all of the device functions when the primary display is open. However, many of the device functions may be limited or disabled when the primary display is closed over the device and/or when a smaller, secondary display is in use. Additionally, users typically want the smallest possible device to conveniently carry in a pocket or purse, but also want larger user interface surfaces for a primary display, keypad, and potentially a secondary display. Some tablet notebook computers and/or phones that have a single display may be used when in an open or closed position, but need relatively complex rotating hinges and hardware components to position the display screen for use while open or closed.

SUMMARY

This summary is provided to introduce simplified concepts of transparent display interaction that are further described below in the Detailed Description. This summary is not intended to identify essential features of the claimed subject matter, nor is it intended for use in determining the scope of the claimed subject matter.

Transparent display interaction is described. In embodiments, a portable device includes a handheld base movably coupled to a display device. The display device includes a display panel system that displays an image, and further includes display surfaces through which the image is viewable. The image may appear as part of an environment that is viewable through the display device, or appear as being projected into the environment behind the display device and viewable through the display surfaces of the display device. The display device is also configurable to open relative the handheld base to a position that the environment is viewable through the display device.

In other embodiments, the environment that is viewable through the display device may include an object, and the displayed image appears as part of the object in the environment. The displayed image may be displayed as a wearable item that appears to be worn by a user who is viewable, at least in part, in the environment that is viewable through the display device. The environment that is viewable through the display device may include text, such as on a sign, a marquee, and/or a building, and a text image of the environment text is displayed magnified. Alternatively, the environment that is viewable through the display device may be a page of content when the display device is positioned over the page, and the displayed image includes text associated with the content on the page.

In other embodiments, the portable device can receive item information, location information, and/or navigation information from a data source. The environment that is viewable through the display device may include an item, and the displayed image includes the information that pertains to the item. Alternatively or in addition, the displayed image may include the location information that corresponds to a location in the environment, which is viewable through the display device. Alternatively or in addition, the displayed image may include the navigation information that appears to display as part of the environment, which is viewable through the display device.

BRIEF DESCRIPTION OF THE DRAWINGS

Embodiments of transparent display interaction are described with reference to the following drawings. The same numbers are used throughout the drawings to reference like features and components.

DETAILED DESCRIPTION

Figure 1:
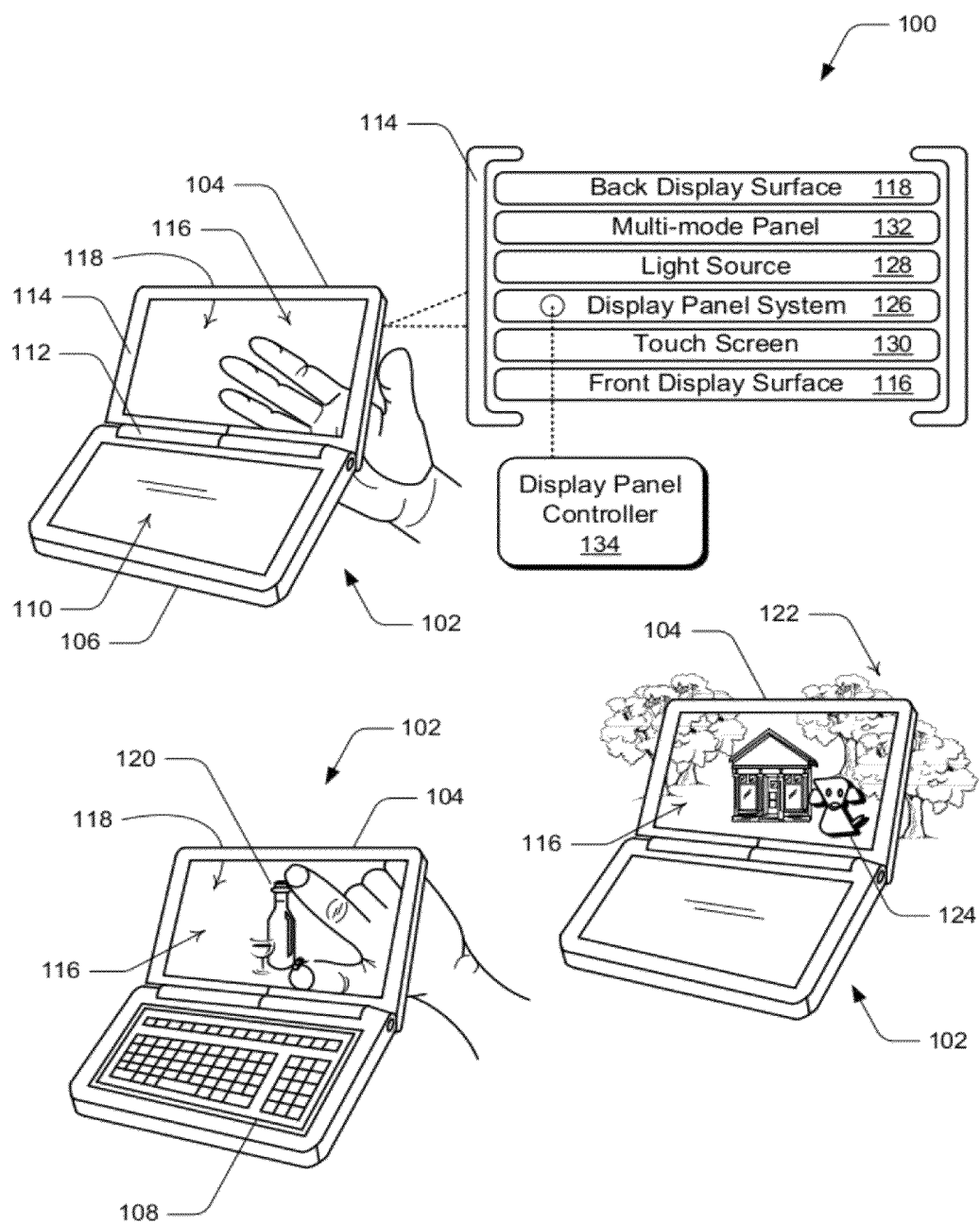
FIG. 1 illustrates examples of a portable device and various embodiments of transparent display interaction.

Embodiments of transparent display interaction are described. A portable device, such as a mobile phone or computer device, includes a display device that can be controlled for transparent and non-transparent display. Optionally, the portable device can also include an additional display device integrated into a handheld base of the portable device. The display device can be movably coupled to the handheld base so that the display device can be positioned to open and close over the handheld base. For example, the display device may open like the display of a notebook computer, slide up like on a slider phone, or flip up like on a flip phone. The display device includes a front display surface and a back display surface, and the front and back display surfaces are viewable from opposite sides of the display device. The display device also includes various display panels and surfaces that are assembled between the front and back display surfaces, and different combinations of the display panels and surfaces may be utilized to implement a transparent display. As described herein, the transparency of a display device may be a percentage of transparency as measured with light detection equipment and/or as visually determined or perceived by a user when viewing through the display device.

Interactions with the portable device having the transparent display device may include displaying an image that appears as part of an environment, which is viewable through the display device. The displayed image can appear as being projected into the environment behind the display device. The environment that is viewable through the display device may also include an object, and the displayed image can appear as part of the object in the environment. The displayed image may be displayed as a wearable item that appears to be worn by a user who is viewable, at least in part, in the environment that is viewable through the display device. The environment that is viewable through the display device may include text, such as on a sign, marquee, and/or a building, and a text image of the environment text can be displayed magnified for easier reading.

In other interactions, the portable device can receive item information, location information, and/or navigation information from a data source. Alternatively or in addition, the portable device may include components that can be utilized for location and navigation determinations, such as a gyro, an accelerometer, and/or a rear-facing camera that can be used to adjust an overlay image onto the environment behind the display device. The environment that is viewable through the display device may include an item, such as a consumer product, and the information that pertains to the item can be displayed. The display device can also display the location information that corresponds to a location in the environment, which is viewable through the display device. Alternatively or in addition, the navigation information can appear to display as part of the environment that is viewable through the display device.

While features and concepts of the described systems and methods for transparent display interaction can be implemented in any number of different environments, systems, devices, and/or various configurations, embodiments of transparent display interaction are described in the context of the following example devices, systems, and configurations.

FIG. 1 illustrates examples 100 of a portable device 102 and various embodiments of transparent display assembly. The portable device includes a display device 104 and a handheld base 106 that may include a physical keyboard (shown at 108) or an additional display device 110 as an integrated component of the portable device. The additional display device may be utilized to display text, graphics, images, user interfaces, and/or a virtual keyboard, such as when an implementation of a portable device does not include a physical keyboard. In the examples, the display device 104 is movably coupled at 112 to the handheld base of the portable device, such as with a rotating hinge, slide track, flip mechanism, or other coupling device. The display device can open and close over the handheld base, such as when folded, slid, or flipped closed over the additional display device, folded around to the back of the handheld base, or any position in-between approximately zero degrees (0°) and three-hundred sixty degrees (360°) relative to the handheld base.

The display device 104 includes a display housing 114 that supports various display panels and surfaces that may be utilized to assemble the display device. In this example, the display device includes a front display surface 116 (also referred to as a first display surface), and includes a back display surface 118 (also referred to as a second display surface). The front display surface and the back display surface are viewable from opposite sides of the display device.

A displayed image 120 may be viewable through the front and back display surfaces, and as illustrated, the display device 104 is transparent. As described herein, the transparency of a display device may be a percentage of transparency as measured with light detection equipment and/or as visually determined or perceived by a user when viewing an environment as seen through the various display panels and surfaces of the display device.

In the illustrated examples, a hand may be viewable through the front and back display surfaces of the display device, such as when viewed through the front of the display device. An environment 122 behind the display device can also be viewable through the front and back display surfaces of the display device, and a displayed image may appear projected into the environment for an augmented view of reality. For example, a displayed image 124 of the dog may appear projected into the environment 122 that includes trees and a building behind the display device and viewable through the front and back display surfaces of the display device.

In addition to the front display surface 116 and the back display surface 118, the display device 104 includes a display panel system 126 that is located between the front and back display surfaces. The display panel system is implemented to display images that are then viewable through the front and/or back display surfaces of the display device. The display device may include a light source 128 that illuminates the display panel system for image display. The display device may also include a touch screen 130 that is located between the front and back display surfaces to sense a touch input to either of the front display surface or the back display surface. Alternatively, the display device may include a first touch screen located proximate the front display surface and a second touch screen located proximate the back display surface, and the touch screens sense touch inputs to the respective front and back display surfaces.

The display device 104 also includes a multi-mode panel 132 located between the front display surface 116 and the back display surface 118. In embodiments, the multi-mode panel is operable to switch on and off, such as to prevent an image from being viewable through the front display surface or the back display surface, or for transparency to permit the image being viewable through the front and back display surfaces. The multi-mode panel may be implemented to switch on and/or off the entire panel, sections of the panel, and/or individual pixels of the panel.

In these examples, the display device 104 includes a display panel controller 134 that is implemented to control display modes of the display device for transparent and non-transparent display. The display panel controller can be implemented as computer-executable instructions, such as a software component, and executed by one or more processors to implement various embodiments for a transparent display. In practice, the portable device 102 is implemented with a processor (e.g., a CPU), a graphics processor (e.g., a GPU), and an internal display controller to drive display content to the display device. In the display device 104, the display panel system 126 may include the display panel controller 134 that drives each pixel according to the type of display at various voltages.

In an embodiment, the display panel controller 134 is implemented to invert a viewable perspective of a displayed image when the image is viewable through the back display surface 118. For example, the displayed image 120 that is viewable through the front display surface 116 would appear as a mirror image when viewed through the back display surface if not inverted, or flipped, by the display panel controller so that the displayed image appears in the same perspective when viewed through either of the front or back display surfaces. The display panel controller can be implemented to invert the pixels in each row of a display to reverse an image.

In various configurations, such as when the display device 104 is positioned open relative to the handheld base 106 of the portable device (e.g., as illustrated in the examples), the display panel controller 134 can activate the display device to prevent a displayed image from being viewable through the front display surface 116 or the back display surface 118. Alternatively, the display panel controller can activate the display device for transparency to permit the displayed image being viewable through the front and back display surfaces. Similarly, the display panel controller can activate the display device for a transparent view of the environment 122, which is viewable through the display device. For example, the display panel controller can control and switch on the multi-mode panel 132 of the display device to prevent a displayed image from being viewable through the back display surface, or switch off the multi-mode panel for transparency to permit the displayed image being viewable through the back display surface.

The portable device 102 may be configured as any type of client or user device that includes wired and/or wireless devices, and may be implemented as a consumer, computer (e.g., a laptop or tablet device), portable, communication, phone (e.g., a dual-display phone), appliance, gaming, media playback, and/or electronic device. The portable device can be implemented with one or more processors, data communication components, memory components, navigation components, data processing and control circuits, and a display system. Further, any of the portable devices described herein can be implemented with any number and combination of differing components as further described with reference to the example device shown in FIG. 8.

Figure 2:
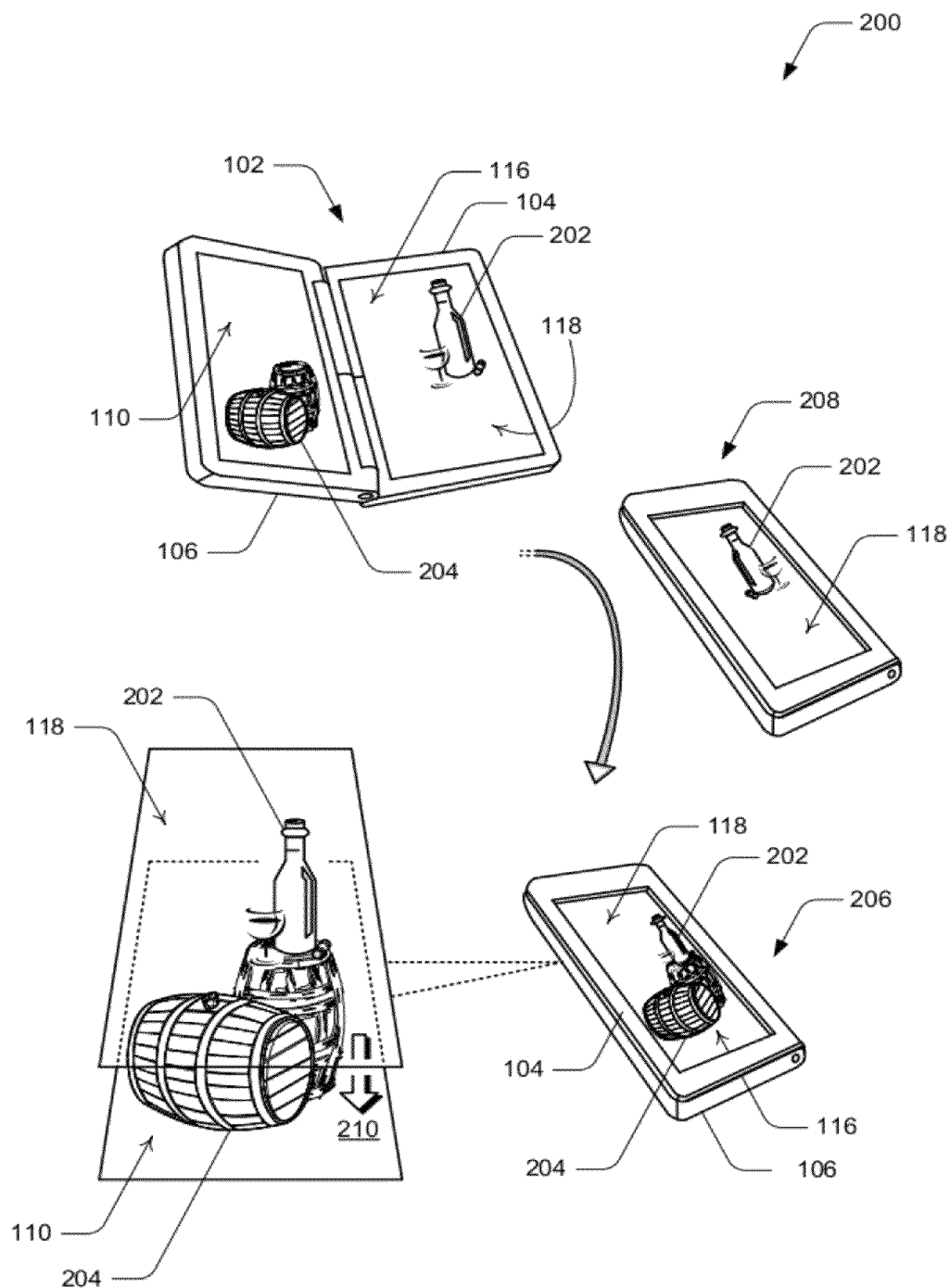
FIG. 2 illustrates examples of a portable device and various embodiments of transparent display interaction.

FIG. 2 illustrates examples 200 of the portable device 102 described above with reference to FIG. 1, and various embodiments of transparent display configuration modes. In the examples 200, an image 202 of a wine bottle and glass are displayed on the display device 104, and an image 204 of wine barrels are displayed on the additional display device 110 that is integrated into the handheld base 106 of the portable device 102. The display device 104 may then be positioned closed over the handheld base 106 and both the image of the wine bottle and glass, and the image of the wine barrels, are viewable through the back display surface 118 of the display device. In the illustrated example at 206, the wine bottle and glass appear to be located on one of the wine barrels when viewed through the display surfaces of the display device.

The display panel controller 134, as described with reference to FIG. 1, can be implemented to activate the display device 104 for transparency when the display device is positioned closed over the handheld base 106 to permit the images being viewable through the display device. The display panel controller may also be implemented to invert and/or rotate the displayed images as the orientation and/or configuration of the portable device changes, such as from portrait to landscape mode and vice-versa. The display panel controller can invert and/or rotate a displayed image before, during, and/or after the display device is positioned closed over the handheld base. For example, when the display device is positioned closed over the handheld base at 208, and before the image 202 of the wine bottle and glass is inverted, the reverse of the image is viewable through the back display surface 118 (note that the image 204 of the wine barrels would also be viewable at 208, but are omitted simply for discussion of the inverted image 202). When the image of the wine bottle and glass is then inverted at 206, the image is viewable in the same perspective (e.g., the wine glass is to the left of the wine bottle) as when viewed through the front display surface 116 when the display device is positioned open relative to the handheld base of the portable device.

In embodiments, a depth-of-field indicated at 210 between the image 202 that is viewable through the back display surface 118 over the additional image 204 displayed on the additional display device 110 appears as a pseudo 3-D display. The depth-of-field creates a visual 3-D effect that can be utilized to enhance a user experience for photos, images, graphics, motion video, and/or user interfaces, such as for multi-tasking and application management. This display configuration provides a wide viewing angle and, as an added benefit, a pseudo 3-D display of images does not involve special 3-D glasses for viewing, which limits viewer eyestrain because a viewer is looking at two separate displays, rather than one display with two separate images displayed on the one display.

Figure 3:
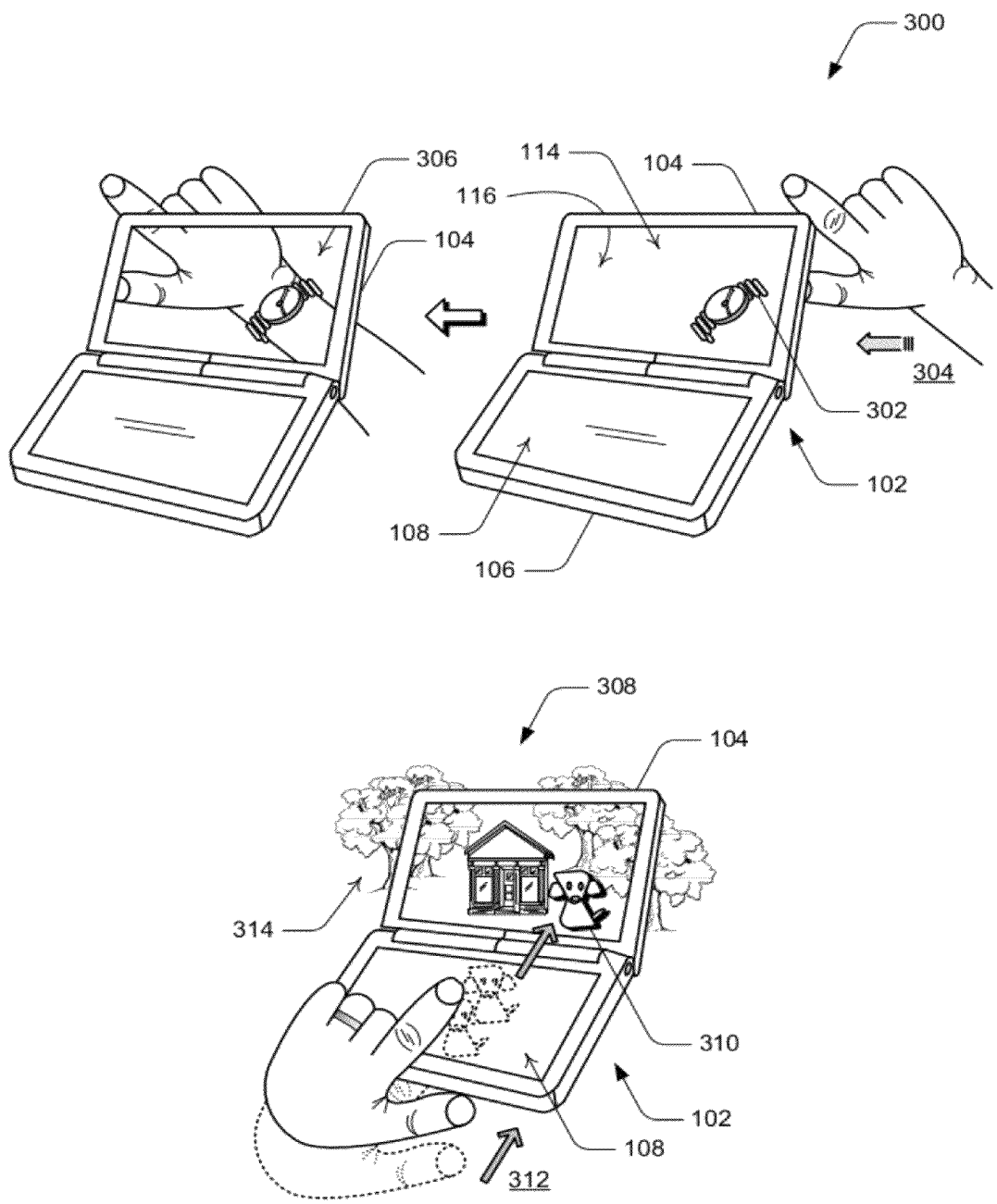
FIG. 3 illustrates examples of a portable device and various embodiments of transparent display interaction.

FIG. 3 illustrates examples of the portable device 102 described above with reference to FIG. 1, and various embodiments of transparent display interaction. In a first example 300, an image 302 of a watch is displayed on the display device 104, and a user of the portable device can move a hand and wrist at 304 to a position behind the display device to virtually try-on the watch. The displayed image of the watch is a wearable item that appears to be worn by a user who is viewable, at least in part, in an environment 306 that is viewable through the display device.

In another example 308, the display panel controller 134 (as described with reference to FIG. 1) is implemented to move an image 310 that is displayed on the additional display device 110 for display on the display device 104 responsive to a user input 312, and the displayed image appears as part of an environment 314 that is viewable through the display device. The display panel controller is also implemented to control the display positions of images for display with reference to objects in environments that are viewable through the display device.

Figure 4:
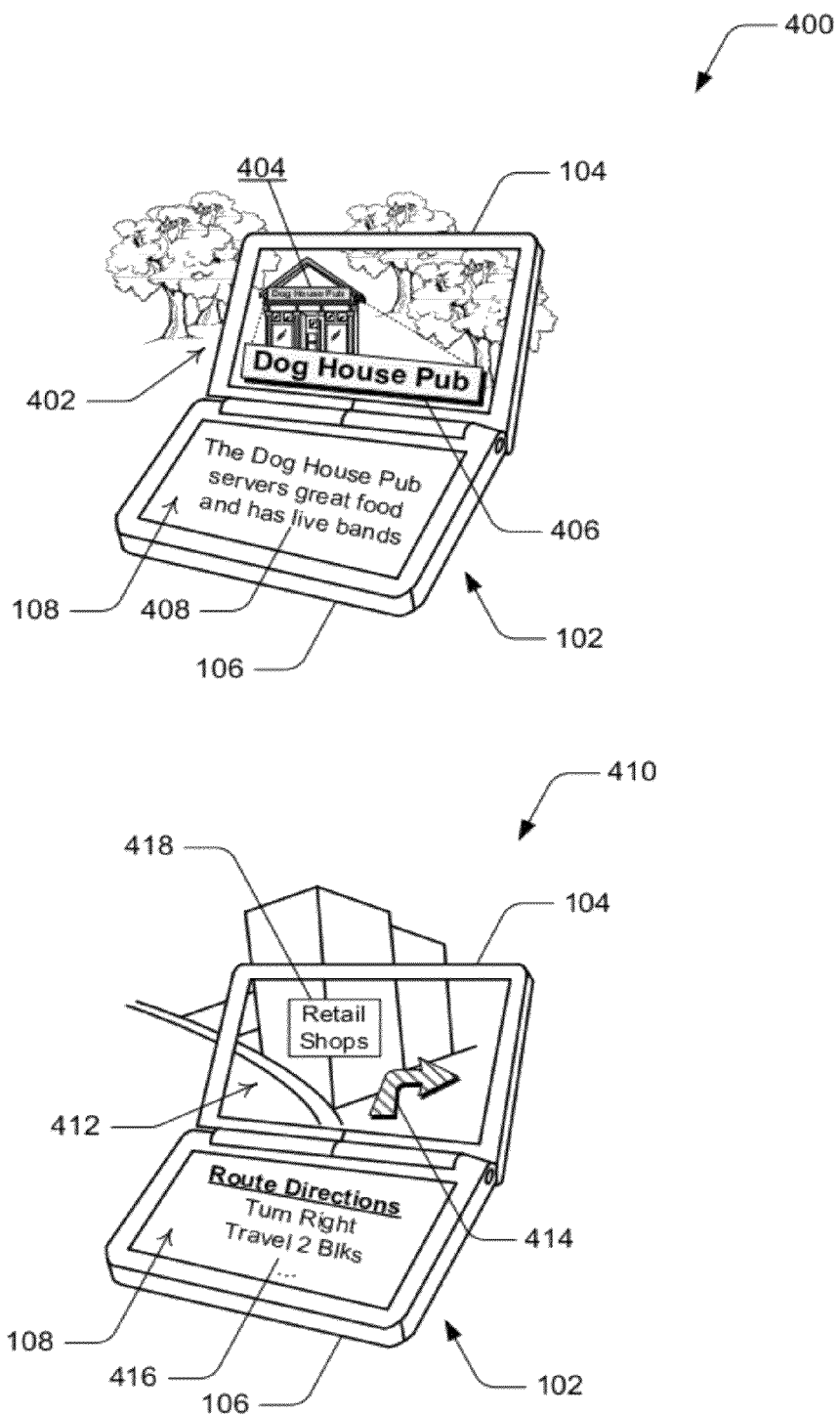
FIG. 4 illustrates examples of a portable device and various embodiments of transparent display interaction.

FIG. 4 illustrates examples of the portable device 102 described above with reference to FIG. 1, and various embodiments of transparent display interaction. In a first example 400, an environment 402 that is viewable through the display device 104 includes text 404, such as text on a sign, marquee, and/or a building. The display panel controller 134 (as described with reference to FIG. 1) can be implemented to generate a text image 406 that displays the environment text magnified on the display device for viewing and/or easier reading.

In other embodiments, the portable device 102 includes a data interface and can receive information about an item from a data source. An environment that is viewable through the display device 104 may include the item, and the information about the item can be displayed for viewing on the display device and/or on the additional display device 110 that is integrated in the handheld base 106 of the portable device. For example, information 408 about the establishment that is viewable through the display device 104 as part of the environment 402 is displayed on the additional display device in the handheld base of the portable device. Other items for which information can be received and displayed may include specifications about a vehicle or consumer information about products when the vehicle and/or the products are viewed in an environment that is viewable through the display device.

In another example 410, an environment 412 of various buildings and streets is viewable through the display device 104 of portable device 102. In embodiments, the portable device can receive location information that corresponds to a location in the environment that is viewable through the display device, and/or navigation information that appears to display as part of the environment that is viewable through the display device. The location and/or navigation information can include GPS coordinate data and/or wireless communication coordinate data.

Recognition software may be implemented in the portable device 102 that compares the location and/or navigation information to correlate the reality viewed in an environment with augmented display information. For example, a navigation indicator 414 is displayed on the display device 104 and appears as part of the environment 412 that is viewable through the display device. Additionally, navigation instructions 416 that correspond to the navigation indicator are displayed on the additional display device 110 in the handheld base 106 of the portable device. In embodiments, augmented reality can include geo-information projected into a view of the environment through the display device 104 to augment the environment. For example, the buildings shown in the environment 412 that are viewable through the display device may include displayed information 418 to inform a viewer about the buildings.

Figure 5:
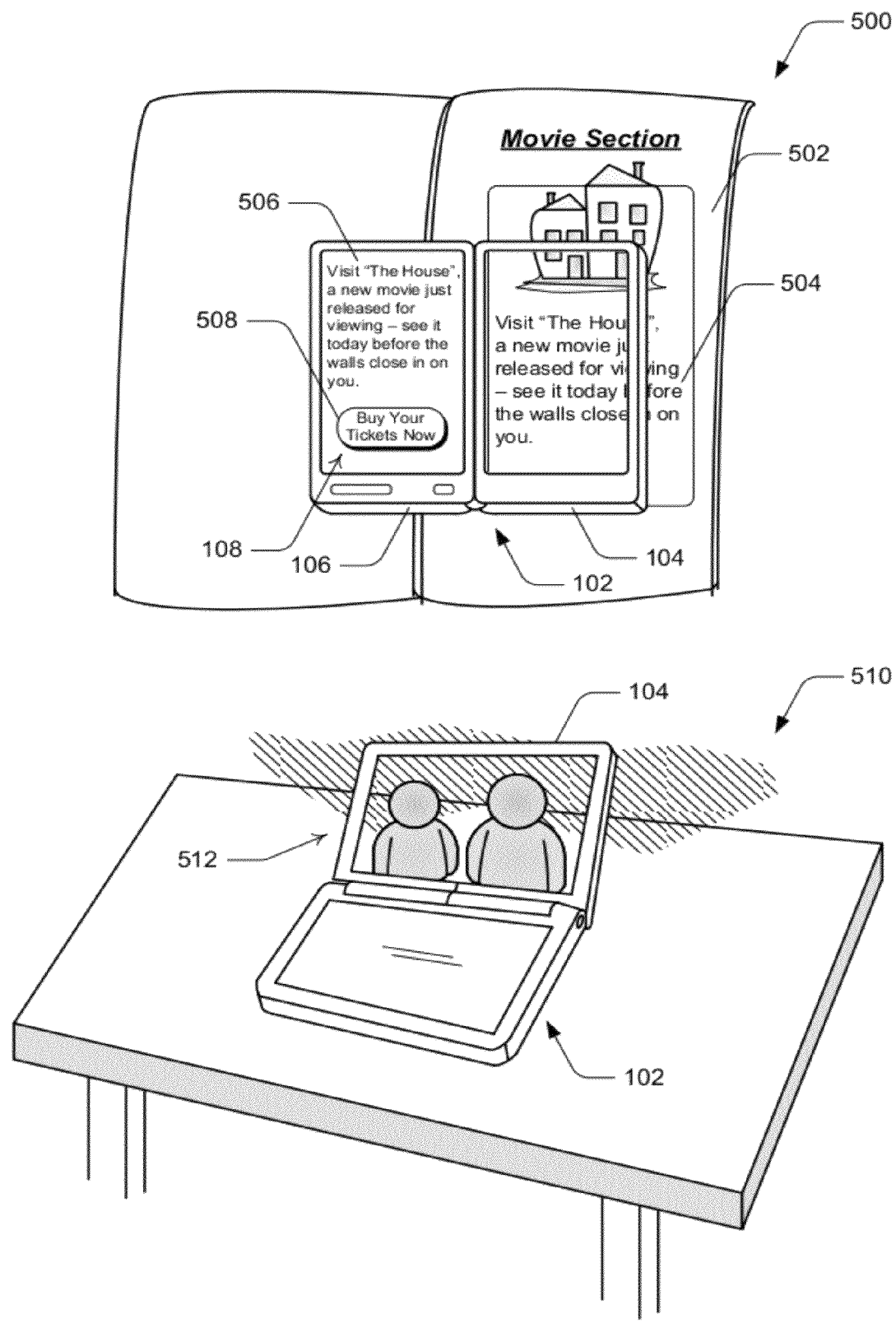
FIG. 5 illustrates examples of a portable device and various embodiments of transparent display interaction.

FIG. 5 illustrates examples of the portable device 102 described above with reference to FIG. 1, and various embodiments of transparent display interaction. In a first example 500, a page of content 502, such as a magazine page or a page of newsprint, is viewable through the display device 104 when the portable device is positioned over the page of content. Images, graphics, and/or text 504 from the page of content 502 can be displayed as an image 506 on the additional display device 110 that is integrated in the handheld base 106 of the portable device. Alternatively or in addition, other images, graphics, and/or text may be displayed on the display device over the page of content that is viewable through the display device. Additional information that is associated with the text 504 and/or the page of content may also be displayed, such as the user selectable control 508 that is selectable to buy movie tickets to the movie that is described in the text on the page of content. Alternatively or in addition, a game or other media content that is associated with the page of content may be displayed for viewer interaction. In another implementation, the image 506 that is displayed on the additional display device 110 may be an answer key to educational questions displayed as text 504 in a text book.

In another example 510, a video conference with others may be displayed on the display device 104 of the portable device. The transparency of the display device provides that the environment 512 behind the display device is viewable through the display device. This may provide a viewer (i.e., a participant in the video conference) with a greater sense of connection to the other video conference participants who appear to be in the same room as the viewer and within the environment.

Figure 6:
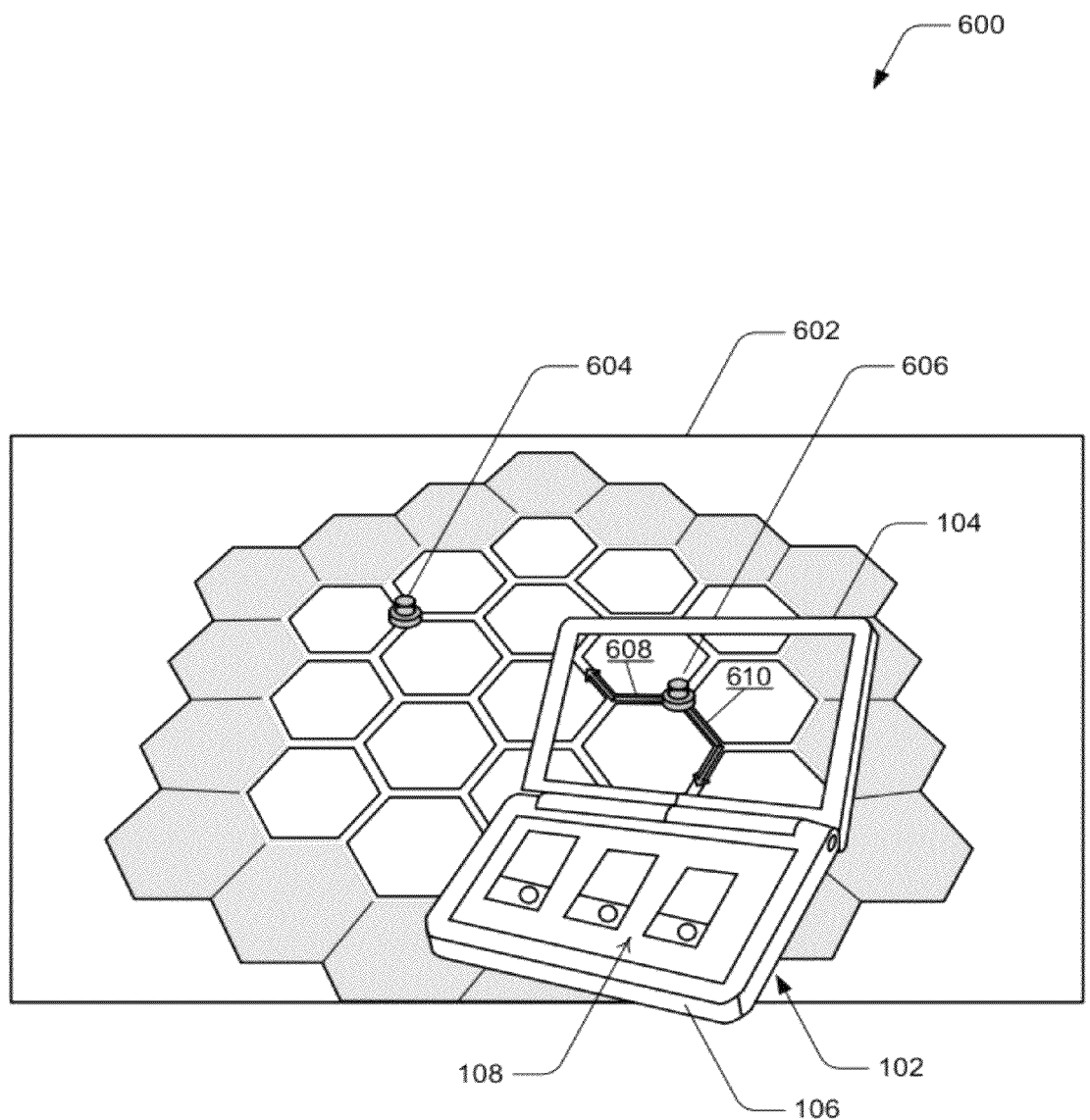
FIG. 6 illustrates an example of a portable device and an embodiment of transparent display interaction.

FIG. 6 illustrates an example 600 of the portable device 102 described above with reference to FIG. 1, and another embodiment of transparent display interaction. In this example, a game board 602 is viewable through the display device 104 when the portable device is positioned over the game board. Images, graphics, and/or text associated with the game can be displayed on the additional display device 110 that is integrated in the handheld base 106 of the portable device. A first game piece 604 is shown on the game board. A second game piece 606 that is also on the game board is viewable through the display device. When the portable device is positioned over the game board, other images, graphics, and/or text associated with the game may be displayed on the display device. For example, possible moves and hints at 608 and 610 for game piece 606 are displayed on the display device, and appear projected onto the game board when viewed through the display device. Other hidden features or clues for the game may also be displayed for viewing on the display device, and a user is provided a new game experience and/or a new level of game interaction.

Example method 700 is described with reference to FIG. 7 in accordance with one or more embodiments of transparent display interaction. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 7:
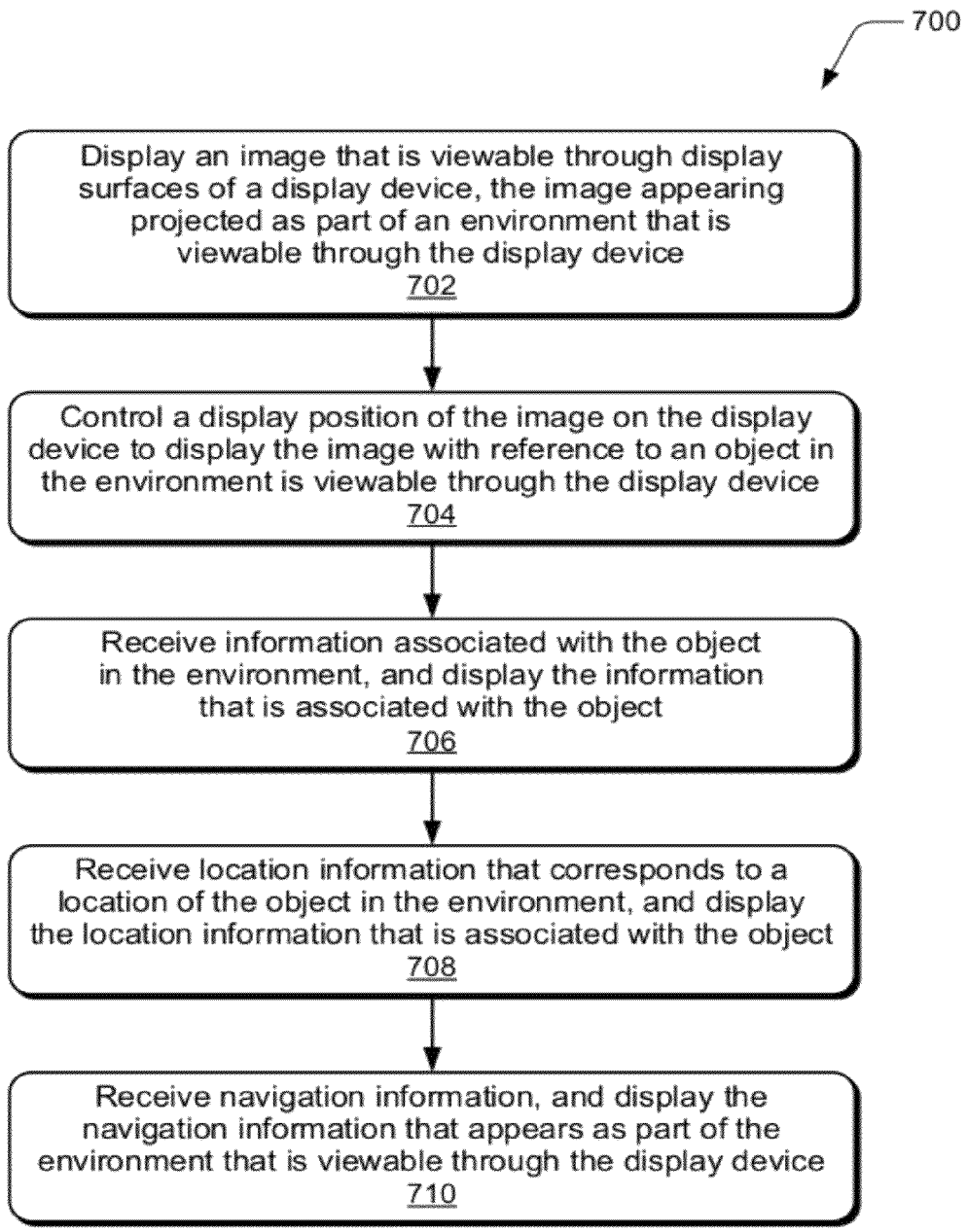
FIG. 7 illustrates example method(s) of transparent display interaction in accordance with one or more embodiments.

FIG. 7 illustrates example method(s) 700 of transparent display interaction. The order in which the method blocks are described are not intended to be construed as a limitation, and any number of the described method blocks can be combined in any order to implement a method, or an alternate method.

At block 702, an image is displayed that is viewable through display surfaces of a display device, the image appearing projected as part of an environment that is viewable through the display device. For example, the portable device 102 (FIG. 1) includes the display device 104, which has the front display surface 116 and the back display surface 118. The displayed image 124 appears projected as part of the environment 122 that is viewable through the display device when the display device is operably transparent.

At block 704, a display position of the image on the display device is controlled to display the image with reference to an object in the environment that is viewable through the display device. For example, the display panel controller 134 controls the display positions of the displayed image 310 (FIG. 3) for display with reference to objects in the environment 314 that is viewable through the display device.

At block 706, information associated with the object in the environment is received, and the displayed image includes the information associated with the object. For example, the portable device 102 includes a data interface and receives information about an item from a data source. The environment 402 (FIG. 4) that is viewable through the display device 104 includes the item (e.g., the building or establishment), and the information 408 about the item is displayed for viewing, such as on the display device 104 or on the additional display device 110 that is integrated into the handheld base 106 of the portable device.

At block 708, location information that corresponds to a location of the object in the environment is received, and the displayed image includes the location information associated with the object. At block 710, navigation information is received, and the displayed image includes the navigation information that appears as part of the environment that is viewable through the display device. For example, the portable device 102 receives location information that corresponds to a location in the environment 412 (FIG. 4) that is viewable through the display device 104, and/or receives navigation information that appears to display as part of the environment that is viewable through the display device. The location and/or navigation information can include GPS coordinate data and/or wireless communication coordinate data. The navigation indicator 414 that is displayed on the display device appears as part of the environment, which is viewable through the display device. Navigation instructions 416 that correspond to the navigation indicator are displayed on the additional display device 110 in the handheld base 106 of the portable device. Additionally, a building shown in the environment, which is viewable through the display device 104, includes the displayed information 418 to inform a viewer about the building.

Figure 8:
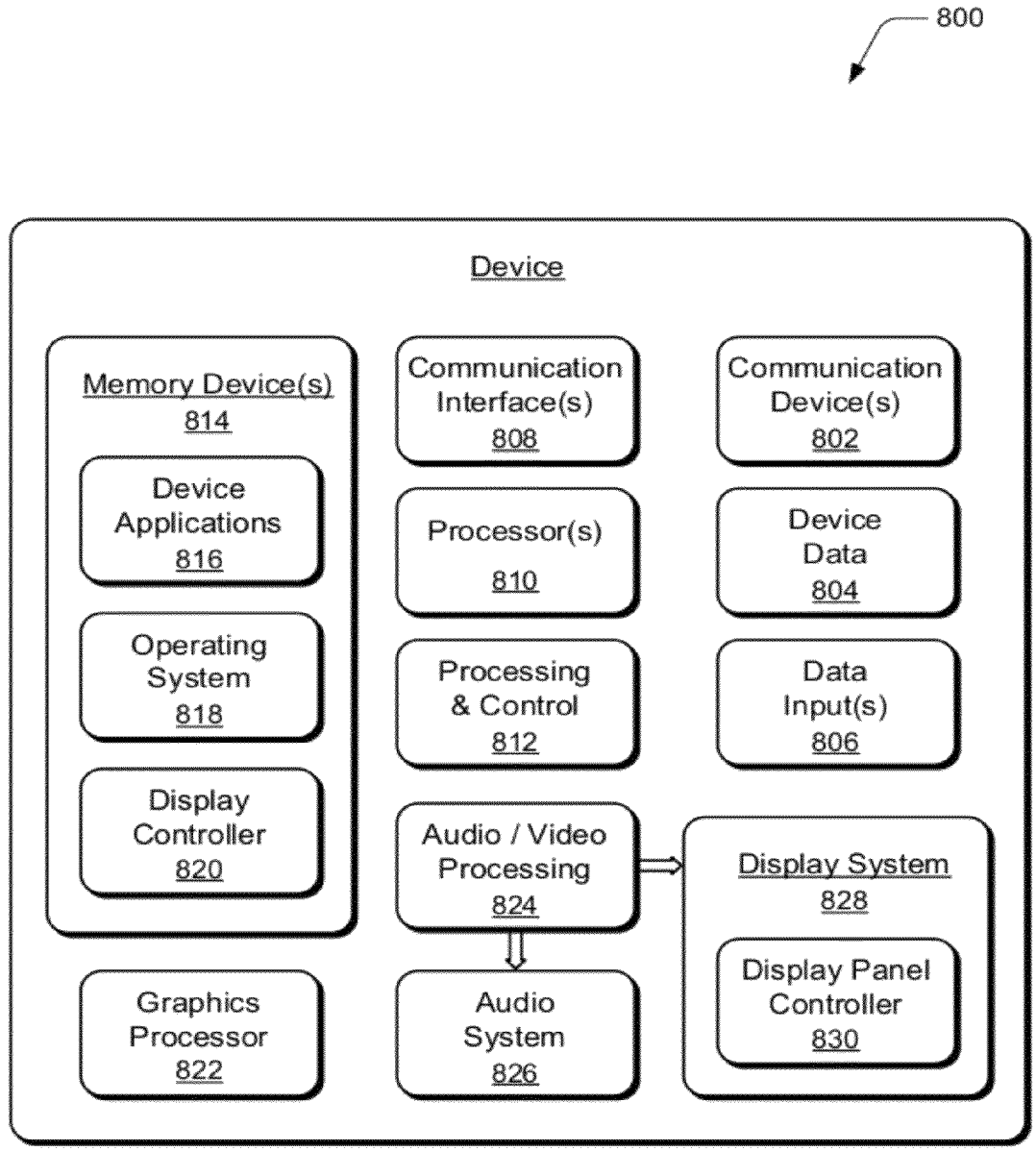
FIG. 8 illustrates various components of an example device that can implement embodiments of transparent display interaction.

FIG. 8 illustrates various components of an example device 800 that can be implemented as a portable device as described with reference to any of the previous FIGS. 1-7. In embodiments, the device may be implemented as any one or combination of a fixed or mobile device, in any form of a consumer, computer, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 800 includes communication devices 802 that enable wired and/or wireless communication of device data 804, such as received data, data that is being received, data scheduled for transmission, data packets of the data, etc. The device data or other device content can include configuration settings of the device, media content stored on the device, and/or information associated with a user of the device. Media content stored on device can include any type of audio, video, and/or image data. The device includes one or more data inputs 806 via which any type of data, media content, and/or inputs can be received, such as user-selectable inputs, messages, communications, music, television content, recorded video content, and any other type of audio, video, and/or image data received from any content and/or data source.

The device 800 also includes communication interfaces 808, such as any one or more of a serial, parallel, network, or wireless interface. The communication interfaces provide a connection and/or communication links between the device and a communication network by which other electronic, computing, and communication devices communicate data with the device.

The device 800 includes one or more processors 810 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 812. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 800 also includes one or more memory devices 814 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like.

Computer readable media can be any available medium or media that is accessed by a computing device. By way of example, and not limitation, computer readable media may comprise storage media and communications media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. The term modulated data signal means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 814 provides data storage mechanisms to store the device data 804, other types of information and/or data, and various device applications 816. For example, an operating system 818 and a display controller 820 can be maintained as software applications with a memory device and executed on the processors. The device applications may also include a device manager, such as any form of a control application, software application, signal processing and control module, code that is native to a particular device, a hardware abstraction layer for a particular device, and so on.

The device 800 may also include a graphics processor 822, and includes an audio and/or video processing system 824 that generates audio data for an audio system 826 and/or generates display data for a display system 828. The audio system and/or the display system may include any devices that process, display, and/or otherwise render audio, video, display, and/or image data. For example, the display system includes a display panel controller 830. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of transparent display interaction have been described in language specific to features and/or methods, the subject of the appended claims is not necessarily limited to the specific features or methods described. Rather, the specific features and methods are disclosed as example implementations of transparent display interaction.

The invention claimed is:

1. A portable device, comprising:
    a display device that includes a display panel system configured to display an image, the image configured to display information about an object in an environment viewable through the display device;
    a data interface configured to receive the information about the object based at least in part on geo-location information;
    display surfaces of the display device through which the image is viewable, the image appearing projected into the environment behind the display device and viewable through the display surfaces of the display device;
    a handheld base of the portable device movably coupled to the display device, the display device configurable to open relative to the handheld base to a position that the environment is viewable through the display device;
    an additional display device integrated into the handheld base and configured to display information about the object in the environment, the environment not being viewable through the additional display device; and a display panel controller configured to correlate a display position of the image for display with reference to the object in the environment based on the geo-location information.

2. A portable device as recited in claim 1, wherein the displayed image appears as part of the object in the environment.

3. A portable device as recited in claim 1, wherein the displayed image is a wearable item that appears to be worn by a user who is viewable, at least in part, in the environment that is viewable through the display device.

4. A portable device as recited in claim 1, wherein the data interface is further configured to receive location information from a data source, and wherein the displayed image includes the location information that corresponds to a location in the environment that is viewable through the display device.

5. A portable device as recited in claim 1, wherein the data interface is further configured to receive navigation information from a data source, and wherein the information displayed on the additional display device includes the navigation information that appears to display as part of the environment that is viewable through the display device.

6. A portable device as recited in claim 1, wherein the environment that is viewable through the display device includes text, and wherein the displayed image includes a text image of the text displayed magnified.

7. A portable device as recited in claim 1, the display panel controller further configured to:
move the item from the additional display device for display on the display device responsive to a user input, the item appearing as part of the object in the environment.

8. A portable device as recited in claim 1, wherein the environment that is viewable through the display device includes a page of content when the display device is positioned over the page, and wherein the information displayed on the additional display device includes text associated with the content on the page that is viewable through the display device.

9. A portable device as recited in claim 1, wherein the item includes a game board; and
wherein the image includes possible moves associated with a game piece on the game board.

10. A display device, comprising:
a transparent display panel system configured to display an image, the image including information about an object in the environment viewable through the transparent display panel system;
a data interface configured to receive the information about the object based at least in part on geo-location information;
a non-transparent display panel system movably coupled to the transparent display and configured to display text and images including the information about the object;
display surfaces of the transparent display panel system that include a front display surface and a back display surface through which the image is viewable, the image appearing projected as part of the environment; and
a display panel controller configured to correlate a display position of the image for display with reference to the object in the environment based on the geo-location information.

11. A display device as recited in claim 10, wherein the displayed image is a wearable item appears to be worn by a user who is viewable, at least in part, in the environment that is viewable through the transparent display panel system.

12. A display device as recited in claim 10, wherein the displayed image appears as part of the object in the environment that is viewable through the transparent display panel system.

13. A display device as recited in claim 10, wherein the displayed image includes location information associated with a location of the object in the environment that is viewable through the transparent display panel system.

14. A display device as recited in claim 10, wherein the information displayed on the non-transparent display panel system includes navigation information that appears to display as part of the environment that is viewable through the transparent display panel system.

15. A display device as recited in claim 10, wherein the environment that is viewable through the transparent display panel system includes a page of content when the transparent display panel system is positioned over the page, and wherein the information displayed on the non-transparent display panel system includes text associated with the content on the page that is viewable through the transparent display panel system.

16. A method, comprising:
displaying an image on a display device, an environment behind the display device not being viewable through the display device;
moving the image from the display device to an additional display device, the additional display device movably coupled to the display device;
displaying the image to be viewable through display surfaces of the additional display device, the image appearing projected as part of an environment that is viewable through the additional display device;
receiving information about an object in the environment viewable through the additional display device based at least in part on geo-location information; and
correlating, based on the geo-location information, a display position of the image on the additional display device to display the image with reference to the object.

17. A method as recited in claim 16, wherein the displayed image includes the information about the object.

18. A method as recited in claim 16, further comprising receiving location information that corresponds to a location of the object in the environment, and wherein the displayed image includes the location information associated with the object.

19. A method as recited in claim 16, further comprising receiving navigation information, and wherein the displayed image includes the navigation information that appears to display as part of the environment that is viewable through the additional display device.

* * * * *